(12) United States Patent
Aburatani et al.

(10) Patent No.: US 12,148,141 B2
(45) Date of Patent: Nov. 19, 2024

(54) DETERMINATION SYSTEM

(71) Applicant: VALQUA, LTD., Tokyo (JP)

(72) Inventors: Yasushi Aburatani, Gojo (JP); Takahiro Fujihara, Gojo (JP)

(73) Assignee: VALQUA, LTD., Tokyo (JP)

( * ) Notice: Subject to any disclaimer, the term of this patent is extended or adjusted under 35 U.S.C. 154(b) by 364 days.

(21) Appl. No.: 17/760,880

(22) PCT Filed: Aug. 28, 2020

(86) PCT No.: PCT/JP2020/032602
§ 371 (c)(1),
(2) Date: Mar. 16, 2022

(87) PCT Pub. No.: WO2021/054085
PCT Pub. Date: Mar. 25, 2021

(65) Prior Publication Data
US 2022/0343489 A1  Oct. 27, 2022

(30) Foreign Application Priority Data
Sep. 20, 2019 (JP) ................. 2019-171758

(51) Int. Cl.
*G06T 7/00* (2017.01)
*G06T 7/73* (2017.01)
*G06T 7/90* (2017.01)

(52) U.S. Cl.
CPC .............. *G06T 7/0004* (2013.01); *G06T 7/73* (2017.01); *G06T 7/90* (2017.01);
(Continued)

(58) Field of Classification Search
None
See application file for complete search history.

(56) References Cited

U.S. PATENT DOCUMENTS

2008/0280040 A1* 11/2008 Barrall ................. F16J 15/125
427/256
2018/0321192 A1* 11/2018 Gardner ............... G01N 29/043

FOREIGN PATENT DOCUMENTS

JP     H0651862 U     7/1994
JP     2001141434 A   5/2001
(Continued)

OTHER PUBLICATIONS

Bearing defect inspection based on machine vision, by Shen et al., Measurement 45 (2012) 719-733 (Year: 2012).*
(Continued)

*Primary Examiner* — Vikkram Bali
(74) *Attorney, Agent, or Firm* — Lando & Anastasi, LLP

(57) ABSTRACT

A determination system includes an imaging unit that captures an image of a gasket already used for flange fastening and an analyzing unit that analyzes, based on the image captured, a contact mark formed on the gasket as a result of contact between the gasket and a pair of flanges when the flanges are fastened through the gasket. The analyzing unit includes a detection unit that detects, in the captured image, a contact mark region indicative of the contact mark and enclosed with a first line and a second line, a distance calculation unit that calculates a distance between the first line and the second line, and a state determination unit that determines, based on at least the distance, whether the flanges are properly fastened through the gasket.

11 Claims, 11 Drawing Sheets

(52) U.S. Cl.
CPC ............... *G06T 2207/10024* (2013.01); *G06T 2207/30164* (2013.01); *G06T 2207/30204* (2013.01)

(56) References Cited

FOREIGN PATENT DOCUMENTS

| | | |
|---|---|---|
| JP | 2016113794 A | 6/2016 |
| JP | 2017219312 A | 12/2017 |

OTHER PUBLICATIONS

International Search Report from International Application No. PCT/JP2020/032602 dated Oct. 13, 2020.

* cited by examiner

FIG.6

|  | WHOLE CIRCUMFERENCE | 1/4 CIRCUMFERENCE | 1/8 CIRCUMFERENCE |
|---|---|---|---|
| POOR FASTENING | 1.6±0.6 | 2.0±0.6 | 1.2±0.2 |
| UNEVEN FASTENING | 3.2±1.7 | 1.5±0.4 | 4.8±0.3 |
| GOOD FASTENING | 5.4±0.5 | 5.1±0.5 | 5.6±0.3 |
| EXCESS FASTENING | 6.9±0.5 | 7.1±0.6 | 6.7±0.4 |

FIG.10

RESULT REPORT

● CONDITIONS OF USE

| PRODUCT NUMBER | SELECTION OF CLASSIFICATION | | |
|---|---|---|---|
| | TEMPERATURE(°C) | PRESSURE (MPa) | FLUID |
| 1111 | 100 | 10 | WATER VAPOR |

● FASTENING STATE

| POOR | GOOD | UNEVEN | EXCESSIVE |
|---|---|---|---|

● ENVIRONMENT OF USE

| INAPPROPRIATE | GOOD |
|---|---|

<FASTENING INDEX>

● CAPTURED IMAGE

● ADVICE

● TECHNICAL MATERIAL LINK

TO TECHNICAL MATERIAL

● INQUIRY LINK

TO INQUIRY

DETERMINATION SYSTEM

CROSS-REFERENCE TO RELATED APPLICATIONS

This application is a U.S. National Stage Application under 35 U.S.C. § 371 of International Application No. PCT/JP2020/032602, filed Aug. 28, 2020, titled DETERMINATION SYSTEM, which claims priority to Japanese Application No. 2019-171758, filed Sep. 20, 2019. International Application No. PCT/JP2020/032602 is incorporated by reference herein in its entirety.

TECHNICAL FIELD

This disclosure relates to a determination system.

BACKGROUND ART

According to a known technology, images of a target object to be evaluated may be captured with, for example, a camera and used for various evaluations. For example, Japanese Patent Laying-Open No. 2016-113794 (PTL 1) describes an art of evaluation of the height of a pattern on a manhole iron cover based on input images of the cover captured from obliquely upward.

CITATION LIST

Patent Literature

PTL 1: Japanese Patent Laying-Open No. 2016-113794

SUMMARY

Technical Problem

In the known art, gaskets may be used as sealing members in flanges of piping to seal fluid running in the piping. Any troubles resulting from the use of such gaskets require technical knowledge and experiences for handling. For example, a person with poor technical knowledge and/or experiences, if he/she checks a used gasket in question (or a captured image of the gasket), may probably fail to find what caused the trouble, often ending up with asking someone with particular skills to check the gasket instead. Thus, quick handling of any troubles may become impossible in case such skilled persons are not present to immediately address the troubles. Such circumstances are necessitating a system operable to readily determine the state of use of a gasket from captured images of the gasket without relying on any individual knowledge and/or experiences.

An object of this disclosure according to an aspect is to provide a determination system that may allow whether a gasket is properly used to be easily determined by analyzing captured images of the gasket.

Solution to the Problem

A determination system according to an embodiment of this disclosure includes an imaging unit that captures an image of a gasket already used for flange fastening, and an analyzing unit that analyzes, based on the image captured, a contact mark formed on the gasket as a result of contact between the gasket and a pair of flanges when the flanges are fastened through the gasket. The analyzing unit includes a detection unit that detects, in the image captured, a contact mark region indicative of the contact mark, the contact mark region being enclosed with a first line and a second line, a distance calculation unit that calculates a distance between the first line and the second line, and a state determination unit that determines, based on at least the distance, whether the flanges are properly fastened through the gasket.

Preferably, the distance calculation unit calculates the distance at two or more positions in the contact mark region and further calculates an average value and a standard deviation of the distances calculated. When the average value stays within a predetermined range of values and the standard deviation is less than a first threshold, the state determination unit determines that the flanges are properly fastened.

Preferably, the state determination unit determines that a fastening force applied for the flanges to be fastened is excessively large when the average value is greater than an upper-limit value of the predetermined range of values.

Preferably, the state determination unit determines that the fastening force applied for the flanges to be fastened is inadequately small when the average value is less than a lower-limit value of the predetermined range of values.

Preferably, the state determination unit determines that the fastening force applied for the flanges to be fastened is considerably variable at different positions of the flanges when the standard deviation is greater than or equal to the first threshold.

Preferably, the analyzing unit further includes a binarization unit that binarizes the image captured to generate a binarized image, and a range setting unit that sets a plurality of analysis ranges in the binarized image. The analysis ranges each include a first range inclusive of the contact mark and a second range inclusive of a part of the gasket in contact with the flanges. The analyzing unit further includes a ratio calculation unit that calculates, for each of the analysis ranges, a first ratio of a predetermined color in the first range and a second ratio of the predetermined color in the second range. The state determination unit determines whether the flanges are properly fastened based on the distances and the first and second ratios in the analysis ranges.

A determination system according to another embodiment of this disclosure includes an imaging unit that captures an image of a gasket already used for flange fastening, and an analyzing unit that analyzes, based on the image captured, a contact mark formed on the gasket as a result of contact between the gasket and a pair of flanges when the flanges are fastened through the gasket. The analyzing unit includes a binarization unit that binarizes the image captured to generate a binarized image, and a range setting unit that sets a plurality of analysis ranges in the binarized image. The analysis ranges each include a first range inclusive of the contact mark and a second range inclusive of a part of the gasket in contact with the flanges. The analyzing unit further includes a ratio calculation unit that calculates, for each of the analysis ranges, a first ratio of a predetermined color in the first range and a second ratio of the predetermined color in the second range, and a state determination unit that determines whether the flanges are properly fastened through the gasket based on the first and second ratios in the analysis ranges.

Preferably, the state determination unit determines that the flanges are properly fastened when the first ratios are greater than or equal to a first reference ratio, the second ratios are greater than or equal to a second reference ratio, and a standard deviation of the second ratios is less than a second threshold.

Preferably, the determination system further includes an environment determination unit that determines whether an environment of use of the already used gasket is appropriate based on the image captured and a reference image of a gasket in good condition prepared in advance.

Preferably, the environment determination unit extracts a contour of the gasket in good condition from the reference image and then calculates an area of a first region enclosed with the contour, extracts a contour of the gasket already used from the image captured and then calculates an area of a second region enclosed with the contour, and then determines that the environment of use of the gasket is appropriate when an area ratio of the second region to the first region stays within a reference range.

Preferably, the determination system further includes an output controlling unit that outputs a result of determination obtained by the state determination unit and a result of determination obtained by the environment determination unit.

Advantageous Effects of Invention

According to the technology disclosed herein, either proper or improper use of the gasket may be readily determined.

BRIEF DESCRIPTION OF DRAWINGS

FIG. 6 is a table showing distances in the contact mark region;
FIG. 10 is a drawing of a displayed result report.

DETAILED DESCRIPTION

Embodiments of the technology disclosed herein are hereinafter described referring to the accompanying drawings. In the description below, like components and technical or structural features are illustrated with the same reference signs. Also, they are referred to likewise and have similar functions. Such components and technical or structural features, therefore, will not be repeatedly described in detail.

System Configuration

Figure 1:
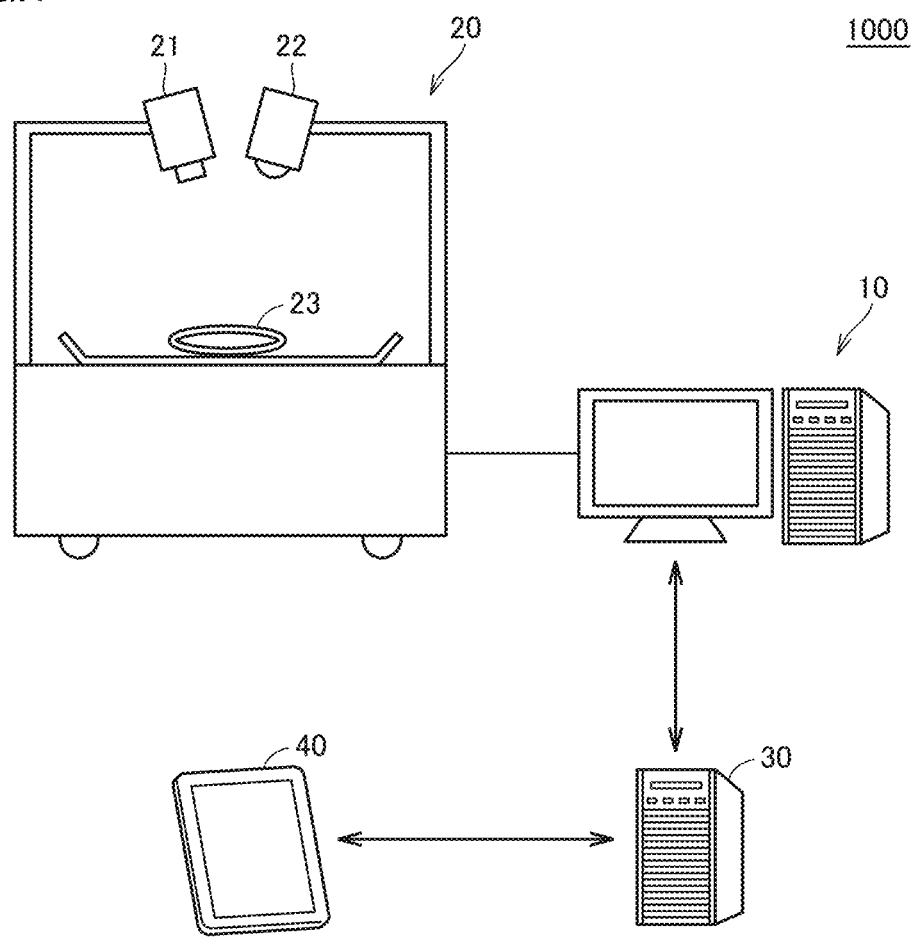
FIG. 1 is a drawing that illustrates the overall structure of a determination system.

FIG. 1 is a drawing that illustrates the overall structure of a determination system 1000. Referring to FIG. 1, determination system 1000 is a system used to determine whether a gasket 23 was properly used. Specifically, the determination system 1000 includes an analyzing device 10, an imaging device 20, a server 30, and a terminal device 40.

Gasket 23 is a sealing member used to seal off an interval between installed parts to allow tight sealing of the parts. A broad range of gaskets may be available as gasket 23, any suitable one of which may be selected and used depending on the state of use of piping. In the embodiments described herein, gasket 23 may be a resin-based gasket. Gasket 23 described herein is a gasket that has been used for flange fastening.

Imaging device 20 captures an image of gasket 23. Imaging device 20 transmits the captured image to analyzing device 10. Specifically, imaging device 20 includes a camera 21 and an illuminating device 22.

For instance, camera 21 may have an optical system including lenses and may also include an imaging element such as CCD (Coupled Charged Device) or CMOS (Complementary Metal Oxide Semiconductor) with a plurality of pixel divisions. The image captured by camera 21 is then transmitted to analyzing device 10. Illuminating device 22 may be a device using, as its light source, LED, fluorescent light, or incandescent light. Illuminating device 22 irradiates an imaging target; gasket 23, with light.

The gasket is pushed into between flanges at the junction of pipes and then secured by tightly fitting bolts into the flanges to prevent leakage of fluid through an interval between the flanges. As a result of contact between projections on the flanges and the surface of a gasket used to fasten the flanges (as a result of the projections being pushed against the gasket surface), a contact mark(s) may be formed on the gasket surface.

In the embodiments described herein, analyzing device 10 analyzes the contact mark thus formed based on the captured image to determine whether gasket 23 was properly used. Analyzing device 10 may typically have a structure that follows general-purpose computer architectures. Analyzing device 10 carries out processes described later by having a processor run a preinstalled program. Analyzing device 10 may be, for example, a desktop PC (personal computer). Analyzing device 10 may be any other device (for example, laptop PC, tablet terminal device) allowed to execute the following functions and processes.

Server 30 is adapted to communicate with analyzing device 10. Server 30 receives processing results obtained from analyzing device 10 and stores therein the received results by compiling them into a database.

Terminal device 40 is adapted to communicate with server 30. Terminal device 40 accesses the database stored in server 30 and displays the processing results obtained by analyzing device 10 on a display device. Terminal device 40, though it may typically be a smartphone, may otherwise be a tablet terminal device. Terminal device 40 may be adapted to communicate with analyzing device 10.

Figure 2:
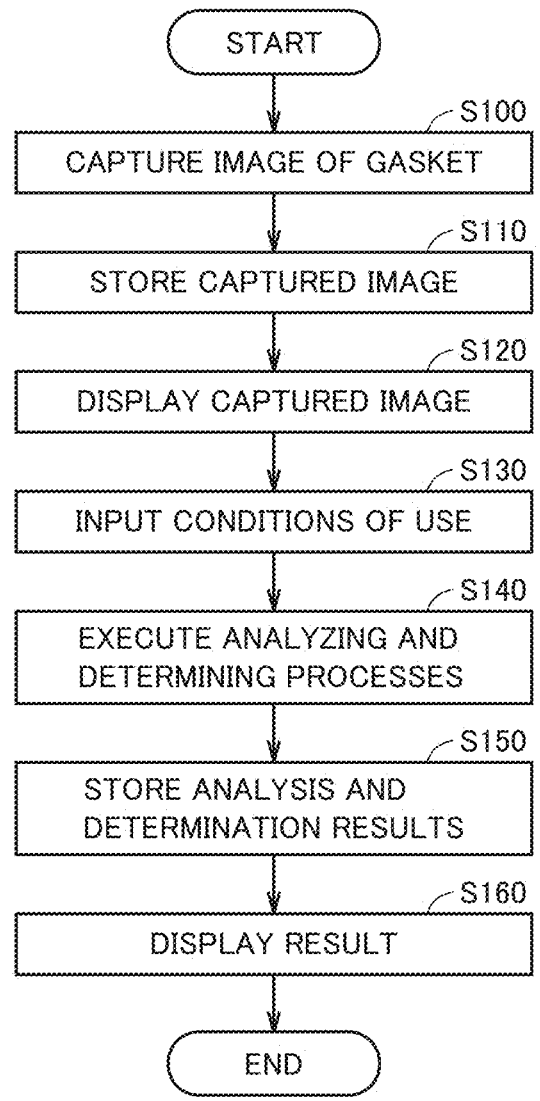
FIG. 2 is a flow chart of an operational outline of the determination system.

FIG. 2 is a flow chart of an exemplified operational outline of the determination system. Referring to FIG. 2, imaging device 20 captures images of gasket 23 (step S100). Analyzing device 10 obtains the captured image of gasket 23 from imaging device 20 and stores the obtained image in its internal memory (step S110). Analyzing device 10 also stores imaging conditions employed at the time of the image of gasket 23 being captured (for example, distance to the subject, resolution, angle of light irradiation, light source wavelength, luminance).

Analyzing device 10 reads the captured image stored in the internal memory and displays the read image on the display device (step S120). Analyzing device 10 receives input of conditions of use at the time of gasket 23 being actually used (step S130). The conditions of use include the product number of gasket 23 and fluid, temperature, and pressure employed at the time of gasket 23 being used.

Analyzing device 10 analyzes the captured image of gasket 23 on the display. Based on an obtained analysis result, analyzing device 10 then carries out a process to determine whether gasket 23 was properly used (step S140). Analyzing device 10 determines, based on the analysis result, whether the paired flanges were properly fastened through gasket 23 and also determines whether gasket 23 was used in an appropriate environment. This operation of analyzing device 10 will be described in detail later. Analyzing device 10 transmits the analysis and determination results to server 30.

Server 30 stores therein the analysis and determination results received from analyzing device 10 by compiling them into a database (step S150). Terminal device 40 obtains the analysis and determination results stored in server 30 and displays the obtained results on the display device (step S160).

In the determination system 1000, either proper or improper use of gasket 23 may be determined based on the captured image of gasket 23. Therefore, no expertise is required of a person who checks gasket 23, allowing him/her to quickly and readily determine whether gasket 23 was properly used or used in an appropriate environment. Thus, any troubles associated with the use of gasket 23 may be efficiently dealt with.

Hardware Configuration

Analyzing device

Figure 3:
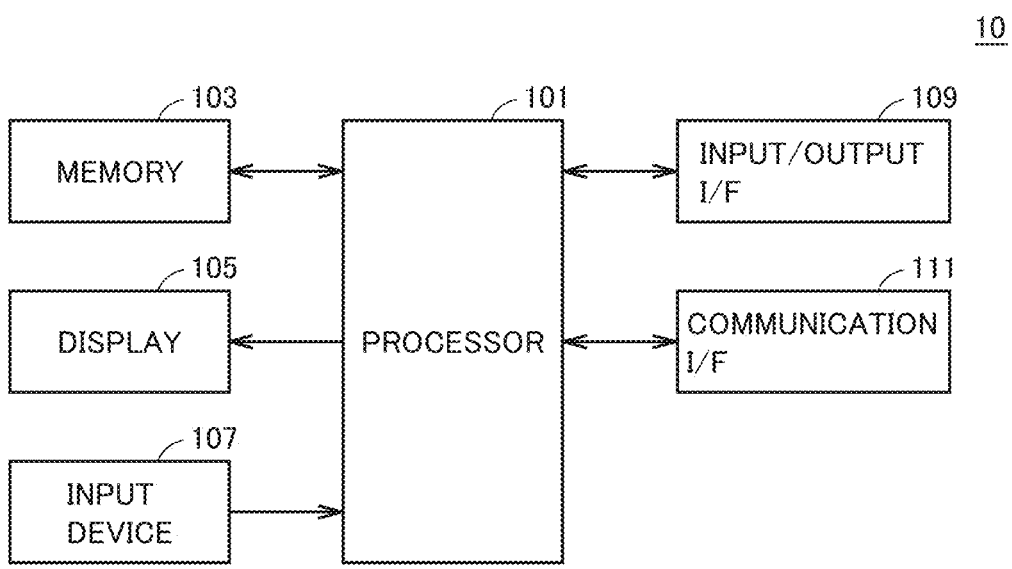
FIG. 3 is a block diagram of exemplified hardware units of an analyzing device.

FIG. 3 is a block diagram of exemplified hardware units of analyzing device 10. Referring to FIG. 3, analyzing device 10 includes a processor 101, a memory 103, a display device 105, an input device 107, an input/output interface (I/F) 109, and a communication interface (I/F) 111. These components are interconnected in a manner that they are allowed to communicate data with one another.

Processor 101 may typically be a computation processor, examples of which may include CPU (Central Processing Unit) and MPU (Multi Processing Unit). Processor 101 reads out a program stored in memory 103 and runs the read program to control operations of the components of analyzing device 10. Specifically, processor 101 runs the program to actualize the functions of analyzing device 10.

Examples of memory 103 may include RAM (Random Access Memory), ROM (Read-Only Memory), flash memories, and hard discs. In memory 103 are storable programs run by processor 101, images captured by imaging device 20, and processing results obtained from the captured images.

Examples of display device 105 may include liquid crystal displays and organic EL (Electro Luminescence) displays. Display device 105 may be integral with analyzing device 10 or may be a separate device apart from analyzing device 10.

Input device 107 receives operational inputs to analyzing device 10. Input device 107 may include a keyboard, buttons, and a mouse. Input device 107 may include a touch panel.

Input/output interface 109 mediates data transmission to and from processor 101 and imaging device 20. Input/output interface 109 may be connectable to camera 21. Through input/output interface 109, imaging instructions are output from processor 101 to camera 21. Camera 21 photographs gasket 23 and outputs a resulting image to processor 101 through input/output interface 109. Processor 101 may provide, through input/output interface 109, illuminating device 22 with instructions on, for example, light irradiation angle and luminance.

Communication interface 111 mediates data transmission to and from processor 101 and server 30. The method of communication employed herein may be wireless communication using, for example, Bluetooth (registered trademark) or wireless LAN (Local Area Network). The method of communication employed otherwise may be cable communication using USB (Universal Serial Bus).

Server

The hardware units of server 30 may be configured likewise as in the known art insofar as they can, on the whole, fulfill the information processes described later. For example, server 30 may include a processor in charge of executing different processes, a memory in which programs and data are storable, a communication interface thorough which various pieces of data are transmitted to and from analyzing device 10, and an input device through which instructions from a user are received.

Terminal Device

The hardware units of terminal device 40 may be configured likewise as in the known art insofar as they can, on the whole, fulfill the information processes described later. For example, terminal device 40 may include a processor, a memory, a communication interface thorough which various pieces of data are transmitted to and from analyzing device 10, a touch panel through which instructions from a user are received, and a display on which various pieces of information are displayable.

Determination Method

Determination of Whether Fastening is Properly Done

Figure 4:
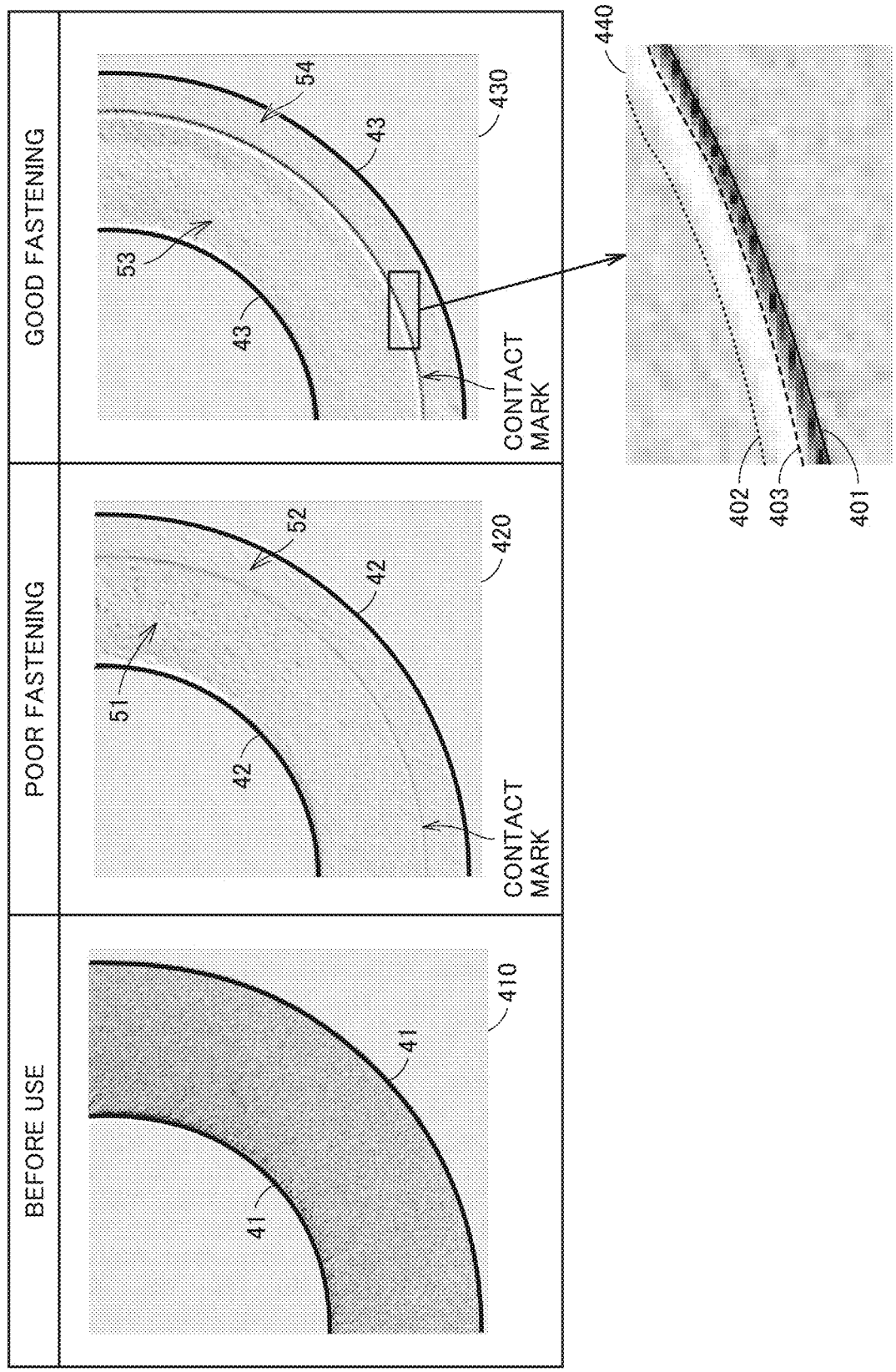
FIG. 4 is a drawing that illustrates a contact mark formed on a gasket.
Figure 5:
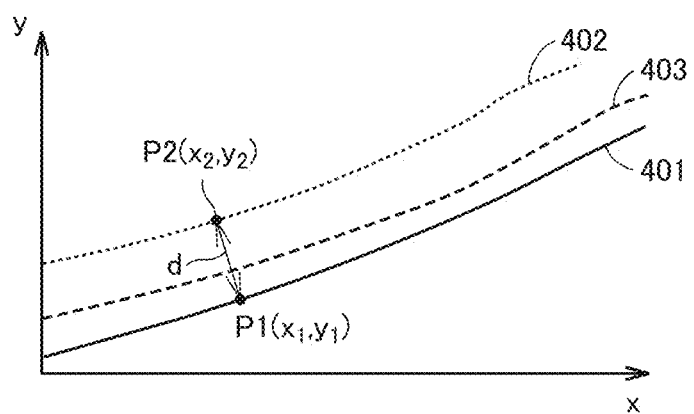
FIG. 5 is a drawing that illustrates an evaluation method for dimensions of a contact mark region.

Next, a method of determining whether paired flanges are properly fastened through a gasket is described referring to FIGS. 4 to 6. As a result of contact between projections on the flanges and the surface of a gasket used (as a result of the projections being pushed against the gasket surface), a contact mark(s) may be formed on the gasket surface. FIG. 4 is a drawing that illustrates a contact mark formed on a gasket.

Referring to FIG. 4, an image 410 is an image captured of the gasket yet to be used. Image 420 is an image captured of the gasket after being used with a poor flange fastening force. Image 430 is an image captured of the gasket after being used with an adequate flange fastening force.

Images 410 to 430 are subjected to gray scale conversion and then emphasized in shading using software based on the wavelength, irradiation angle and luminance of a light source used. Bold lines 41 to 43 rendered in images 410 to 430 indicate the contours of the gasket. Bold lines 41 to 43 are automatically rendered based on the distance to the subject and size-related information of the gasket (inner diameter, outer diameter). In image 420, a region 51 on the inner side than a contact mark is a depressed region under the pressure of the flanges, while a region 52 on the outer side of the contact mark is an intact region unpressed by the flanges. In image 430, a region 53 on the inner side than the contact mark is a depressed region, while a region 54 on the outer side than the contact mark is an intact region.

The comparison of images 410 to 430 may confirm that the gasket before use has no contact mark but the gasket after use has a contact mark. The comparison of images 420 and 430 indicate that a contact mark on the gasket in image 430 may be more clearly visible than in image 420. The state of the flanges being fastened, therefore, may be estimated through analysis of the contact mark on the gasket.

In image 440 showing an enlarged contact mark of image 430, different regions are confirmable; black region enclosed with lines 401 and 403, and white region enclosed with lines 402 and 403. This embodiment defines the following region as a contact mark region exhibiting a contact mark; region enclosed with line 401 drawn on the outer edge of the black region and line 402 drawn on the inner edge of the white region.

FIG. 5 is a drawing that illustrates an evaluation method for dimensions of the contact mark region. Referring to FIG. 5, an optional point on line 401 is expressed as $P1(x_1, y_1)$. The point of intersection of line 402 and a normal line of point P1 is expressed as $P2(x_2, y_2)$. Then, the value of d is calculated as $((x_1-x_2)^2+(y_1-y_2)^2)^{1/2}$, where d is a distance between points P1 and P2. This distance d may be used as an indicator for evaluation of sizes of the contact mark region. In this embodiment, distance d is calculated at a plurality of positions (for example, at 10 positions) in the contact mark region. Distance d between point P1 and point P2 corresponding to point P1 is calculated at each of a plurality of points P1 on line 401.

FIG. 6 is a table 600 showing distances d in the contact mark region. Table 600 shows four gaskets for different fastening states; "poor fastening," "uneven fastening," "good fastening," and "excess fastening," and also shows average values and standard deviations of distances d in the contact mark regions of these gaskets.

The gasket for "poor fastening" was used when the flanges were fastened with a poor fastening force. The gasket for "uneven fastening" was used when the flanges were fastened at their different positions unevenly with different forces (for example, tightly bolted at a certain position of the flanges and loosely bolted at another position). The gasket for "good fastening" was used when the flanges were fastened with an adequate fastening farce. The gasket for "excess fastening" was used when the flanges were fastened with a too powerful fastening force.

Table 600 also shows average values and standard deviations of distances d for "whole circumference," "¼ circumference," and "⅛ circumference" of the gaskets. The average values of distance d for "whole circumference" are each an average value of distances d in the contact mark region included in the image captured of the whole gasket. The average values of distance d for "¼ circumference" are each an average value of distances d in the contact mark region included in the image captured in an optional one-quarter portion of the whole gasket image. The average values of distance d for "⅛ circumference" are each an average value of distances d in the contact mark regions included in the image captured in an optional one-eighth portion of the whole gasket image.

In the case of, for example, the "whole circumference" of the gasket for "good fastening," the average value of distances d is 5.4, and the standard deviation of distances d is 0.5. In the case of, for example, the "¼ circumference" of the gasket for "excess fastening," the average value of distances d is 7.1, and the standard deviation of distances d is 0.6.

Now, distances d for the "whole circumference" of the four gaskets, in particular, are discussed below. As to the "whole circumference," the average value of distances d shows a smallest value for "poor fastening" (for example, 1.6), while showing a largest value for "excess fastening" (for example, 6.9). This applies to the "¼ circumference" and "⅛ circumference" as well. The standard deviation shows values less than or equal to 0.6 for "poor fastening," "good fastening," and "excess fastening," while showing a significantly large value; 1.7, for "uneven fastening." This teaches that, in the case of the gasket for "good fastening," the average value of distances d in the contact mark region stays within a predetermined range of values G (for example, range of values from 4.0 to 6.0), and the standard deviation of distances d is less than a threshold Th1 (for example, 1.0).

Thus, analyzing device 10 determines the state of paired flanges being fastened through gasket 23 as "good fastening" when an obtained analysis result indicates that a condition X1 is satisfied; condition X1 defining that the average value of distances d in the contact mark region formed in gasket 23 stays within the predetermined range of values G and the standard deviation of distances d is less than threshold Th1.

Analyzing device 10 determines the fastening state of flanges as "excess fastening" when the average value of distances d is greater than an upper-limit value of predetermined range of values G (for example, 6.0). Analyzing device 10 determines the fastening state of flanges as "poor fastening" when the average value of distances d is less than a lower-limit value of predetermined range of values G (for example, 4.0). Analyzing device 10 determines the fastening state of flanges as "uneven fastening" when the standard deviation of distances d is greater than or equal to threshold Th1.

The fastening state of flanges may be more precisely estimated based on distances d in the "¼ circumference" and "⅛ circumference" of the gaskets. To be specific, which part(s) of the flanges is tightly fastened or loosely fastened may be estimated by comparing distances d in the "¼ circumference" of the four gaskets. This teaches that when, for example, the average value of distances d for a certain "¼ circumference" is greater than the average value of distances d for another "¼ circumference," a more powerful fastening force is applied at a position of the flanges corresponding to the other "¼ circumference" than at the position of the flanges corresponding to the certain "¼ circumferential." When, for example, eight different values of distance d in the "¼ circumference" are compared to one another, the fastening forces at different parts of the flanges may be more precisely estimated.

Figure 7:
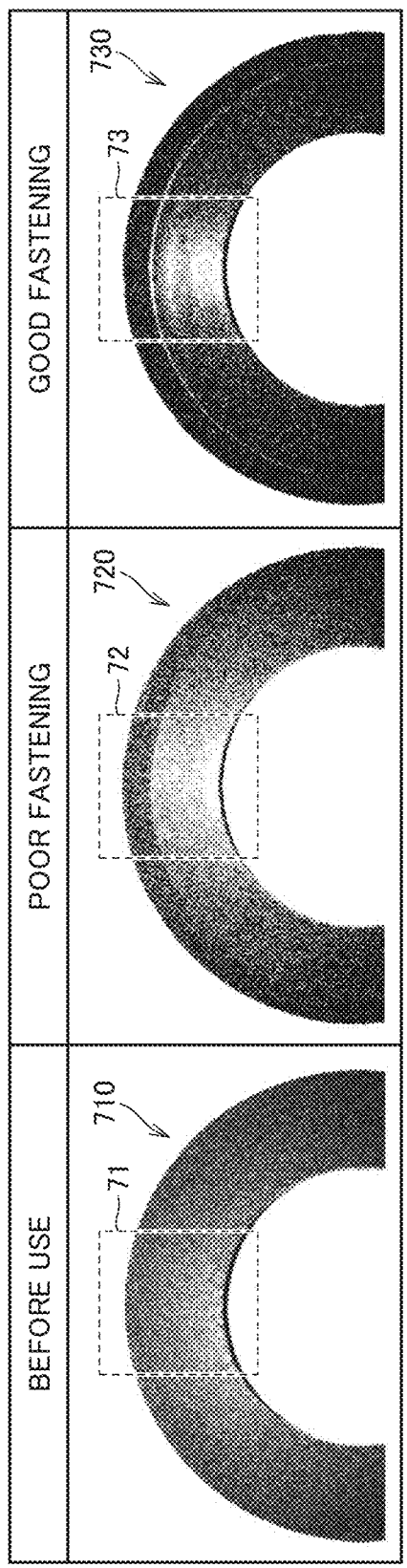
FIG. 7 is a drawing of binarized images of a gasket before and after use.
Figure 8:
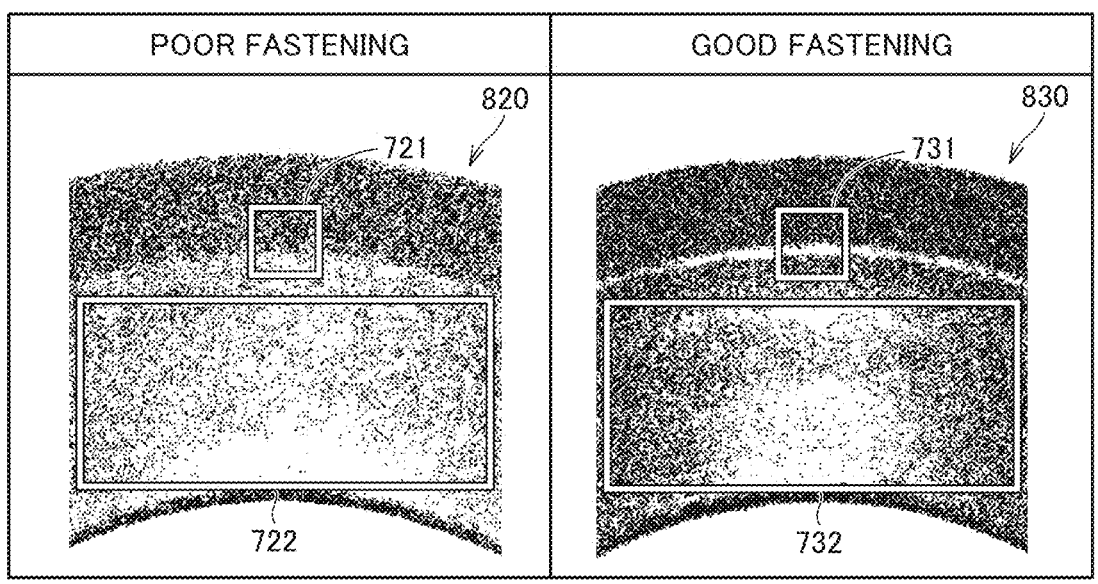
FIG. 8 is a drawing of enlarged images of analysis ranges.

Next, another method of determining whether paired flanges are properly fastened through a gasket is described referring to FIGS. 7 and 8. FIG. 7 is a drawing of binarized images of a gasket before and after use. Images 710 to 730 illustrated in FIG. 7 are binarized images obtained from an image captured of the gasket subjected to gray scale conversion and then binarized using software based on the wavelength, irradiation angle and luminance of a light source used.

Referring to FIG. 7, image 710 is a binarized image of the gasket yet to be used. Image 720 is a binarized image of the gasket after being used with a poor flange fastening force. Image 730 is a binarized image of the gasket after being used with an adequate flange fastening force.

In images 710 to 730, the periphery of the analysis ranges 71 to 73 on the upper side of the gasket are irradiated with light. Differences are detectable between white regions and black regions included in analysis ranges 71 to 73. The state of the flanges being fastened when the gasket was used may be estimated by comparing white and black ratios in analysis ranges 71 to 73. For example, the black ratio of a certain range is represented by the ratio of black pixels to all of pixels included in this range. This applies to the white ratio as well.

FIG. 8 is a drawing of enlarged images of an analysis range. Referring to FIG. 8, an image 820 is an enlarged image of analysis range 72 in image 720. An image 830 is an enlarged image of analysis range 73 in image 730. Analysis range 72 includes a contact mark range 721 inclusive of the contact mark and a contact range 722 inclusive of a part of contact of the gasket with the flanges. The part of contact is a part of the gasket in contact with (pressed by) the flanges when the gasket is placed between the flanges. Analysis range 73 includes a contact mark range 731 and a contact range 732.

When contact mark ranges 721 and 731 are compared with each other, contact mark range 731 of the gasket for "good fastening" has been further emphasized in shading than contact mark range 721 of the gasket for "poor fastening." Specifically, the black ratio in contact mark range 731 is greater than the black ratio in contact mark range 721, allowing the contact mark in contact mark range 731 to be more clearly visible. The degree of deformation (depression) of the gasket, therefore, is assumed to be acceptable in an analysis range inclusive of a contact mark range insofar as the black ratio in this contact mark range is greater than or equal to a reference ratio E1 (for example, 60%).

When contact range 732 is compared with contact range 722, light diffusion and reflection are better controlled in contact range 732 of the gasket for "good fastening" than in contact range 722 of the gasket for "poor fastening," strongly suggesting a greater black ratio in the former contact range. Thus, the black ratio in contact range 732 is greater than the black ratio in contact range 722. The degree of contact between the gasket and the flanges, therefore, is assumed to be acceptable in an analysis range inclusive of a contact range insofar as the black ratio in this contact range is greater than or equal to a reference ratio E2 (for example, 60%). The reference ratios E1 and E2 may be equal or may differ from each other.

In each of a plurality of analysis ranges of the gasket (for example, eight analysis ranges), analyzing device 10 calculates the black ratio in the contact mark range and the black ratio in the contact range and then determines whether the flanges are properly fastened based on these black ratios. Specifically, analyzing device 10 determines the state of paired flanges being fastened through gasket 23 as "good fastening" when a condition X2 is satisfied; condition X2 defining that all of the black ratios in the contact mark ranges (for example, eight contact mark ranges) are greater than or equal to reference ratio E1, all of the black ratios in the contact ranges (for example, eight contact ranges) are greater than or equal to reference ratio E2, and the standard deviations of the black ratios in the contact ranges are less than threshold Th2 (for example, 15%)

Optionally, the method described referring to FIGS. 4 to 6 and the method described referring to FIGS. 7 and 8 may be combined to determine whether the flanges are properly fastened. To be specific, analyzing device 10 may determine that the flanges are properly fastened when conditions X1 and X2 are both satisfied. Thus, the determination results thereby obtained may further improve in accuracy.

Determination of Whether the Environment of Use is Appropriate

A gasket, if used in an inappropriate environment, may possibly deform or chip off even without any problem in the gasket-used fastening of flanges. In a method hereinafter described, whether the gasket was used in an appropriate environment is determined depending on the shape of the used gasket.

Figure 9:
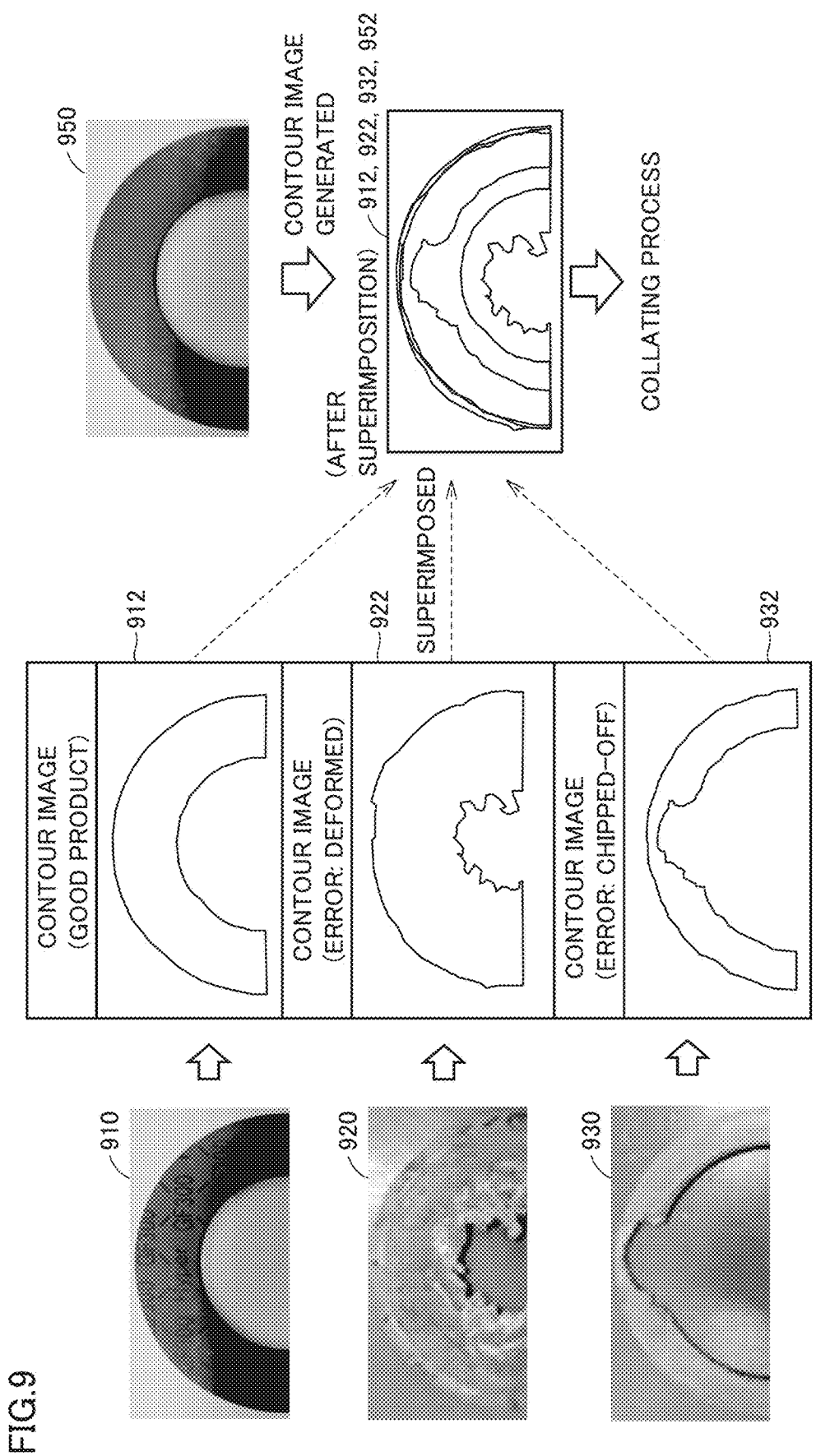
FIG. 9 is a drawing that illustrates how to determine whether an environment of use of a gasket is appropriate.

FIG. 9 is a drawing that illustrates how to determine whether the gasket was used in an appropriate environment. Referring to FIG. 9, an image 910 is an image of a gasket in good condition, an image 920 is an image of a defective gasket with a defect Y1, and an image 930 is an image of a defective gasket with a defect Y2.

Specifically, image 920 is an image indicative of a phenomenon, conventionally called flower spot or blooming, caused in a resin-based gasket by a polymerizable monomer(s). The flower spot (or blooming) is considered to occur in and is likely to break a gasket when a monomer fluid is penetrated into and polymerized in the gasket and is thereby expanded in volume. Image 930 is an image indicative of erosion of a soft gasket caused by a slurry fluid. The erosion is generated by a physical action as a result of collision of high-speed fine particles against the gasket.

Images 910 to 930 may be prestored in, for example, the memory of analyzing device 10. In case images 910 to 930 are stored in an external device (for example, server 30), analyzing device 10 obtains these images from the external device.

Analyzing device 10 processes images 910 to 930 to extract their contours and accordingly generate a contour image 912 of image 910, a contour image 922 of image 920, and a contour image 932 of image 930. Analyzing device 10 extracts the contour of an image 950 of the used gasket (for example, image captured of gasket 23) to generate a contour image 952. Analyzing device 10 superimposes contour images 912, 922, and 932 with contour image 952 to collate images 910 to 930 with a sample image.

When an area ratio R1 of contour image 952 to contour image 912 stays within a reference range (for example, ±10%), the shape of the used gasket may be substantially the same as that of the gasket in good condition. Thus, analyzing device 10 determines that the used gasket was used in an appropriate environment.

When the ratio R1 is beyond the reference range, the shape of the used gasket may vastly differ from that of the gasket in good condition. Thus, analyzing device 10 may determine that the used gasket was used in an inappropriate environment. When an area ratio R2 of contour image 952 to contour image 922 stays within a reference range, analyzing device 10 may determine that the used gasket is undergoing defect Y1. When an area ratio R3 of contour image 952 to contour image 932 stays within a reference range, analyzing device 10 may determine that the used gasket is undergoing defect Y2.

Thus, analyzing device 10 compares the images captured of gasket 23 and images of a gasket in good condition and of a defective gasket to one another and is thereby allowed to determine whether gasket 23 was used in an appropriate environment and what type of defect gasket 23 is undergoing.

Display of Determination Result

Analyzing device 10 transmits the analysis and determination results of gasket 23 to server 30. Server 30 stores in its memory the analysis and determination results. Terminal device 40 displays a result report, as illustrated in FIG. 10, based on the analysis and determination results obtained from server 30.

FIG. 10 is a drawing of an exemplified result report displayed. Referring to FIG. 10, terminal device 40 includes a user interface screen 150 on which a result report is displayable. User interface screen 150 includes display regions 152, 154, and 156, a captured image 158 of gasket 23, an average value distribution 160 of distances d, an advice region 162, a technical material link region 164, and an inquiry link region 166.

On display region 152 are displayed conditions for the use of gasket 23. On display region 154 is displayed a determination result on the state of the flanges being fastened through gasket 23. On display region 156 is displayed a determination result on the environment of the use of gasket 23.

In the example illustrated in FIG. 10, the product number of gasket 23 is "1111", the temperature and pressure at which gasket 23 was used are respectively 100° C. and 10 MPa, water vapor was used as fluid, and the fastening state and the environment of use were favorable. Distribution 160 indicates that distances d are substantially equal in the whole circumference of gasket 23.

In the case of an improper fastening state (for example, one of "poor fastening," "uneven fastening," and "excess fastening") with an appropriate environment of use, advice region 162 displays an advice, for example, "please check the section—management of torque values—on the technical material." In case the flanges are properly fastened but the environment of use is inappropriate, advice region 162 displays an advice, for example, "please check the section—recommended product numbers/high-end model numbers—on the technical material." In case the flanges are improperly fastened and the environment of use is inappropriate, advice region 162 displays an advice, for example, "please check the technical specs or make an inquiry if necessary." These advices may invite a user of terminal device 40 to click technical material link region 164 or inquiry link region 166, allowing him/her to take any suitable actions.

Functional Units

Figure 11:
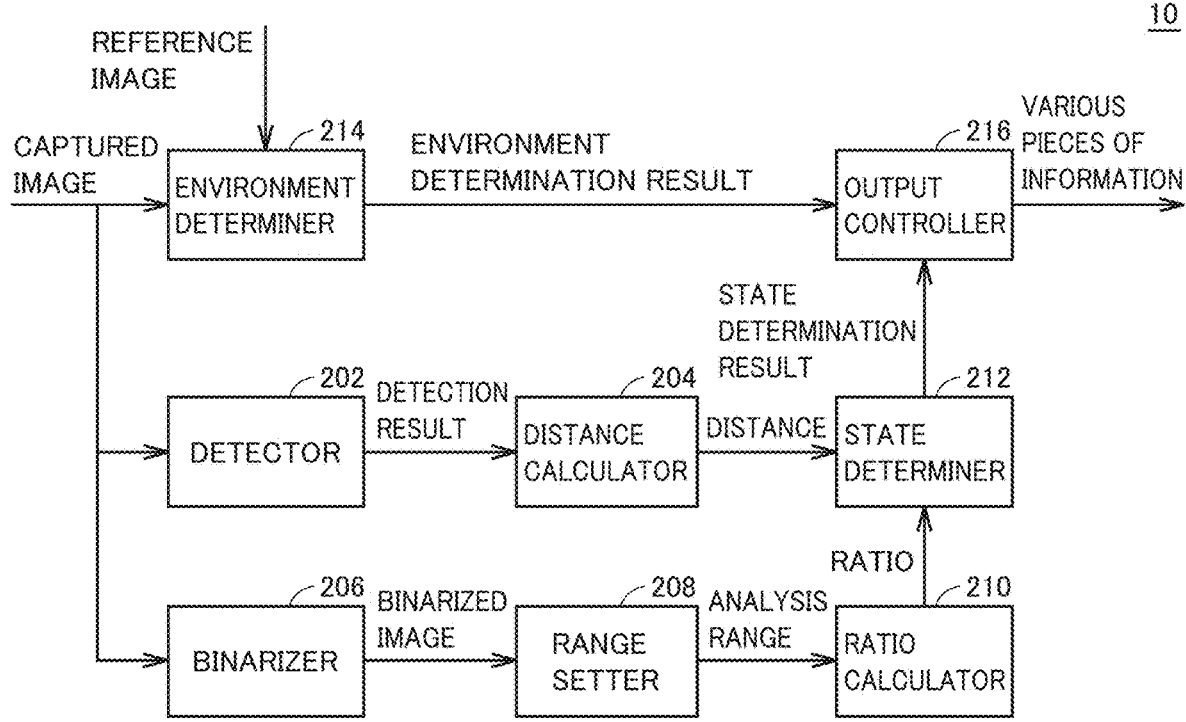
FIG. 11 is a block diagram of exemplified functional units of the analyzing device.

FIG. 11 is a block diagram of exemplified functional units of analyzing device 10. Referring to FIG. 11, principal functional units of analyzing device 10 include a detector 202, a distance calculator 204, a binarizer 206, a range setter 208, a ratio calculator 210, a state determiner 212, an environment determiner 214, and an output controller 216. These functional units are executable by prompting processor 101 of analyzing device 10 to run the program stored in memory 103. These functional units in part or in whole may otherwise be feasible by hardware.

Referring to FIG. 11, detector 202 detects, in an image of gasket 23 captured by imaging device 20, a contact mark region enclosed with lines 401 and 402. Any suitable image processing technique (for example, edge detection process) may be employed to detect the contact mark region using detector 202.

Distance calculator 204 calculates distance d between lines 401 and 402. Distance calculator 204 calculates distance d at two or more positions in the contact mark region. Distance calculator 204 calculates, at each of points P1 on line 401, distance d between point P1 and point P2 on line 402 corresponding to point P1. Distance calculator 204 calculates an average value and standard deviation of distances d for these points.

Binarizer 206 binarizes an image of gasket 23 captured by imaging device 20 into a binarized image. Range setter 208 sets a plurality of analysis ranges in the binarized image. Typically, range setter 208 automatically sets a plurality of analysis ranges illustrated in FIG. 7 (for example, analysis range 73 of image 730). Typically, two or more analysis ranges are equally set in the whole circumference of gasket 23. Instead, range setter 208 may set these analysis ranges in response to a user's instruction.

Ratio calculator 210 calculates, for each of the analysis ranges, a first ratio of a predetermined color (for example, black) in a contact mark range (for example, contact mark range 731) and a second ratio of the predetermined color in a contact range (for example, contact range 732).

In an aspect of the technology disclosed herein, state determiner 212 determines whether the paired flanges are properly fastened through gasket 23 based on distance d. Specifically, state determiner 212 determines that the paired flanges are properly fastened when the average value of distances d stays within predetermined range of values G and the standard deviation of distances d is less than threshold Th1. When the average value of distances d is greater than an upper-limit value of the predetermined range of values G, state determiner 212 determines that the fastening force applied for the paired flanges to be fastened is excessively large. When the average value of distances d is less than a lower-limit value of the predetermined range of values G, state determiner 212 determines that the fastening force applied for the paired flanges to be fastened is inadequately small. When the standard deviation of distances d is greater than or equal to threshold Th1, state determiner 212 determines that the fastening force applied for the flanges to be fastened is considerably variable at different positions of the flanges.

In an aspect of the technology disclosed herein, state determiner 212 determines whether the paired flanges are properly fastened through gasket 23 based on the first ratios and the second ratios in the respective analysis ranges. State determiner 212 determines that the flanges are properly fastened when the first ratios are greater than or equal to first reference ratio E1, the second ratios are greater than or equal to second reference ratio E2, and the standard deviation of the second ratios is less than threshold Th2.

In another aspect of the technology disclosed herein, state determiner 212 determine whether the flanges are properly fastened based on distances d calculated by distance calculator 204 and the first ratios and the second ratios calculated by ratio calculator 210. Specifically, state determiner 212 determines that the flanges are properly fastened when the average value of distances d stays within predetermined range of values G and the standard deviation of distances d is less than threshold Th1 (equivalent to condition X1) and also when the first ratios are greater than or equal to reference ratio E1, the second ratios are greater than or equal to reference ratio E2 and the standard deviation of the second ratios is less than threshold Th2 (equivalent to condition X2).

Environment determiner 214 determines whether gasket 23 was used in an appropriate environment based on the image captured of used gasket 23 (for example, image 950) and a reference image of a gasket in good condition prepared in advance (for example, image 910). Specifically, environment determiner 214 extracts the contour of the gasket in good condition from the reference image and calculates an area AR1 of a region enclosed with the contour. Specifically, environment determiner 214 extracts the contour of the already used gasket 23 from the image captured and calculates an area AR2 of a region enclosed with the contour. When the ratio of area AR2 to area AR1 (for example, ratio R1) stays within a reference range, environment determiner 214 determines that gasket 23 was used in an appropriate environment.

Output controller 216 outputs the determination result of state determiner 212 (state determination result) and the determination result of environment determiner 214 (environment determination result). Specifically, output controller 216 transmits these obtained results to server 30. Output controller 216 may display the obtained results on display device 105.

Advantages

In this embodiment described thus far, either proper or improper use of gasket 23 may be determined based on the captured image of the already used gasket. This may allow any person with or without expertise to quickly determine whether the gasket was properly used or used in an appropriate environment. Thus, any troubles associated with the use of the gasket may be speedily handled and solved.

Other Embodiments (1) Server 30 may include some of the functional units of analyzing device 10 described in the earlier embodiment illustrated in FIG. 11. For example, analyzing device 10 may be equipped with detector 202 and binarizer 206, while server 30 may be equipped with distance calculator 204, ratio calculator 210, state determiner 212, environment determiner 214, and output controller 216. In this instance, analyzing device 10 transmits the result of detection by detector 202 and the binarized images to server 30.

(2) In the earlier embodiment, the steps of control illustrated in the flow chart described above may be programmed and run by a computer. The program thus provided may be recorded on a non-transitory, computer-readable recording medium, examples of which may include, flexible disc attached to the computer, CD-ROM (Compact Disk Read Only Memory), secondary storage device, main storage device, and memory card. Then, the medium-stored program may be offered as a program product. The program may be recorded on a hard disc embedded in the computer and provided. The program may be downloaded through a network.

The program may be so configured that any necessary one(s) of available program modules partly constituting an operating system (OS) of the computer are selectively invoked and run according to a certain sequence and predetermined timings. In this instance, such modules are not included in the program per se, and processes are executed in collaboration with the OS. The program thus configured containing no module may be included in the scope of programs according to this embodiment. The program according to this embodiment may be incorporated into another program and provided. In this instance, any modules included in another program are not included in this program per se, and processes are executed in collaboration with the module-incorporated program. The program thus incorporated into another program may be included in the scope of programs according to this embodiment.

(3) It should be understood that any technical features illustrated herein are only presented by way of example and may be combined with the known art, omitted in part, or modified without departing from the scope of this disclosure. In the embodiments described herein, the processes and/or configuration described in the other embodiments may be suitably employed and carried out.

The embodiments disclosed herein are given by way of example in all aspects and should not be construed as limiting the scope of this disclosure. The scope of this disclosure is solely defined by the appended claims and is intended to cover the claims, equivalents, and all of possible modifications made without departing the scope of this disclosure.

REFERENCE SIGNS LIST

10: analyzing device, 20: imaging device, 21: camera, 22: illuminating device, 23: gasket, 30: server, 40: terminal Device, 101: processor, 103: memory, 105: display, 107: input device, 109: input/output interface, 111: communication interface, 150: user interface screen, 202: detector, 204: distance calculator, 206: binarizer, 208: range setter, 210: ratio calculator, 212: state determiner, 214: environment determiner, 216: output controller.

What is claimed is:

1. A determination system, comprising:
an imaging device that captures an image of a gasket already used for flange fastening; and
an analyzing device that analyzes, based on the image captured, a contact mark formed on the gasket as a result of contact between the gasket and flanges provided in a pair when the flanges are fastened through the gasket, the analyzing device comprising a processor configured to:
detect, in the image captured, a contact mark region indicative of the contact mark, the contact mark region being enclosed within a first line and a second line;
calculate a distance between the first line and the second line at a plurality of positions in the contact mark region;
calculate an average value and a standard deviation of the distances calculated; and
determine that the flanges are properly fastened when the average value stays within a predetermined range of values and the standard deviation is less than a first threshold.

2. The determination system according to claim 1, wherein the processor is further configured to determine that a fastening force applied for the flanges to be fastened is excessively large when the average value is greater than an upper-limit value of the predetermined range of values.

3. The determination system according to claim 1, wherein the processor is further configured to determine that the fastening force applied for the flanges to be fastened is inadequately small when the average value is less than a lower-limit value of the predetermined range of values.

4. The determination system according to claim 1, wherein the processor is further configured to determine that the fastening force applied for the flanges to be fastened is considerably variable at different positions of the flanges when the standard deviation is greater than or equal to the first threshold.

5. The determination system according to claim 1, wherein the processor is further configured to:
binarize the image captured to generate a binarized image;
set a plurality of analysis ranges in the binarized image, the plurality of analysis ranges each comprising a first range inclusive of the contact mark and a second range inclusive of a part of the gasket in contact with the flanges;
calculate, for each of the plurality of analysis ranges, a first ratio of a predetermined color in the first range and a second ratio of the predetermined color in the second range; and
determine whether the flanges are properly fastened based on the distances and the first and second ratios in the plurality of analysis ranges.

6. The determination system according to claim 1, wherein the processor is further configured to determine whether an environment of use of the gasket already used is appropriate based on the image captured and a reference image of a gasket in good condition prepared in advance.

7. The determination system according to claim 6, wherein the processor is further configured to:
- extract a contour of the gasket in good condition from the reference image and then calculate an area of a first region enclosed with the contour;
- extract a contour of the gasket already used from the image captured and then calculate an area of a second region enclosed with the contour; and
- determine that the environment of use of the gasket already used is appropriate when an area ratio of the second region to the first region stays within a reference range.

8. The determination system according to claim 7, wherein the processor is further configured to output a result of determination of whether the flanges are properly fastened through the gasket and a result of determination of whether the environment of use of the gasket already used is appropriate.

9. A determination system comprising:
- an imaging device that captures an image of a gasket already used for flange fastening; and
- an analyzing device that analyzes, based on the image captured, a contact mark formed on the gasket as a result of contact between the gasket and flanges provided in a pair when the flanges are fastened through the gasket, the analyzing device comprising a processor configured to:
  - binarize the image captured to generate a binarized image;
  - set a plurality of analysis ranges in the binarized image, the plurality of analysis ranges each comprising a first range inclusive of the contact mark and a second range inclusive of a part of the gasket in contact with the flanges;
  - calculate, for each of the plurality of analysis ranges, a first ratio of a predetermined color in the first range and a second ratio of the predetermined color in the second range; and
  - determine whether the flanges are properly fastened through the gasket based on the first and second ratios in the plurality of analysis ranges.

10. The determination system according to claim 9, wherein the processor is further configured to determine that the flanges are properly fastened when the first ratios are greater than or equal to a first reference ratio, the second ratios are greater than or equal to a second reference ratio, and a standard deviation of the second ratios is less than a second threshold.

11. A determination system, comprising:
- an imaging device that captures an image of a gasket already used for flange fastening; and
- an analyzing device that analyzes, based on the image captured, a contact mark formed on the gasket as a result of contact between the gasket and flanges provided in a pair when the flanges are fastened through the gasket, the analyzing device comprising a processor configured to:
  - detect, in the image captured, a contact mark region indicative of the contact mark, the contact mark region being enclosed within a first line and a second line;
  - calculate a distance between the first line and the second line; and
  - determine, based on at least the distance, whether the flanges are properly fastened through the gasket;
  - binarize the image captured to generate a binarized image;
  - set a plurality of analysis ranges in the binarized image, the plurality of analysis ranges each comprising a first range inclusive of the contact mark and a second range inclusive of a part of the gasket in contact with the flanges;
  - calculate, for each of the plurality of analysis ranges, a first ratio of a predetermined color in the first range and a second ratio of the predetermined color in the second range; and
  - determine whether the flanges are properly fastened based on the distances and the first and second ratios in the plurality of analysis ranges.

* * * * *